(12) United States Patent
Billard

(10) Patent No.: US 12,324,374 B2
(45) Date of Patent: Jun. 10, 2025

(54) AGRICULTURAL DEVICE WITH A CUTTER BAR AND A REMOVABLE COLLECTING DEVICE AND AGRICULTURAL MACHINE COMPRISING SUCH A DEVICE

(71) Applicant: KUHN SAS, Saverne (FR)

(72) Inventor: Sylvain Billard, Reinhardsmunster (FR)

(73) Assignee: KUHN SAS, Saverne (FR)

( * ) Notice: Subject to any disclaimer, the term of this patent is extended or adjusted under 35 U.S.C. 154(b) by 775 days.

(21) Appl. No.: 17/305,076

(22) Filed: Jun. 30, 2021

(65) Prior Publication Data

US 2022/0000032 A1 Jan. 6, 2022

(30) Foreign Application Priority Data

Jul. 6, 2020 (FR) ...................................... 20 07140

(51) Int. Cl.
| | |
|---|---|
| *A01D 43/10* | (2006.01) |
| *A01D 34/66* | (2006.01) |
| *A01D 57/30* | (2006.01) |

(52) U.S. Cl.
CPC ............. *A01D 43/10* (2013.01); *A01D 57/30* (2013.01); *A01D 34/664* (2013.01)

(58) Field of Classification Search
CPC ........ A01D 57/30; A01D 57/20; A01D 57/00; A01D 43/10; A01D 34/664
See application file for complete search history.

(56) References Cited

U.S. PATENT DOCUMENTS

| | | | |
|---|---|---|---|
| 4,392,339 A | | 7/1983 | Berlivet et al. |
| 4,597,250 A | * | 7/1986 | Amstutz ................. A01D 43/00 56/13.6 |
| 5,031,393 A | * | 7/1991 | Rostoucher .......... A01D 43/077 56/192 |
| 2001/0045087 A1 | | 11/2001 | Franet et al. |

(Continued)

FOREIGN PATENT DOCUMENTS

| | | | | |
|---|---|---|---|---|
| EP | 0439991 A1 | * | 8/1991 | |
| EP | 1 155 609 A1 | | 11/2001 | |
| EP | 1389413 B1 | * | 3/2012 | ........... A01D 34/661 |

(Continued)

OTHER PUBLICATIONS

French Preliminary Search Report issued May 20, 2021 in French Application 20 07140 filed on Jul. 6, 2020, 8 pages (with English Translation of Categories of Cited Documents & Written Opinion).

*Primary Examiner* — Adam J Behrens
*Assistant Examiner* — Madeline I Runco
(74) *Attorney, Agent, or Firm* — Oblon, McClelland, Maier & Neustadt, L.L.P.

(57) ABSTRACT

An agricultural device is movable in a direction of advance and includes: a cutter bar equipped with cutting elements intended to cut a standing crop product; a conditioner positioned behind the cutter bar; and a grouping device intended to move the product transversely to the direction of advance and located behind the cutter bar, in an active position. A retraction actuator is configured to transpose the grouping device between the active position and a passive position in which the product is deposited at the rear of the device. A collecting device extends partially under and partially behind the conditioner in active position of the grouping device.

13 Claims, 5 Drawing Sheets

(56) References Cited

U.S. PATENT DOCUMENTS

2005/0172598 A1* 8/2005 Billard .................. A01D 57/20
56/192

FOREIGN PATENT DOCUMENTS

| FR | 3 080 738 A1 | 11/2019 |
| GB | 2 088 684 A | 6/1982 |
| WO | 2016/162862 A1 | 10/2016 |

* cited by examiner

[Fig. 1]
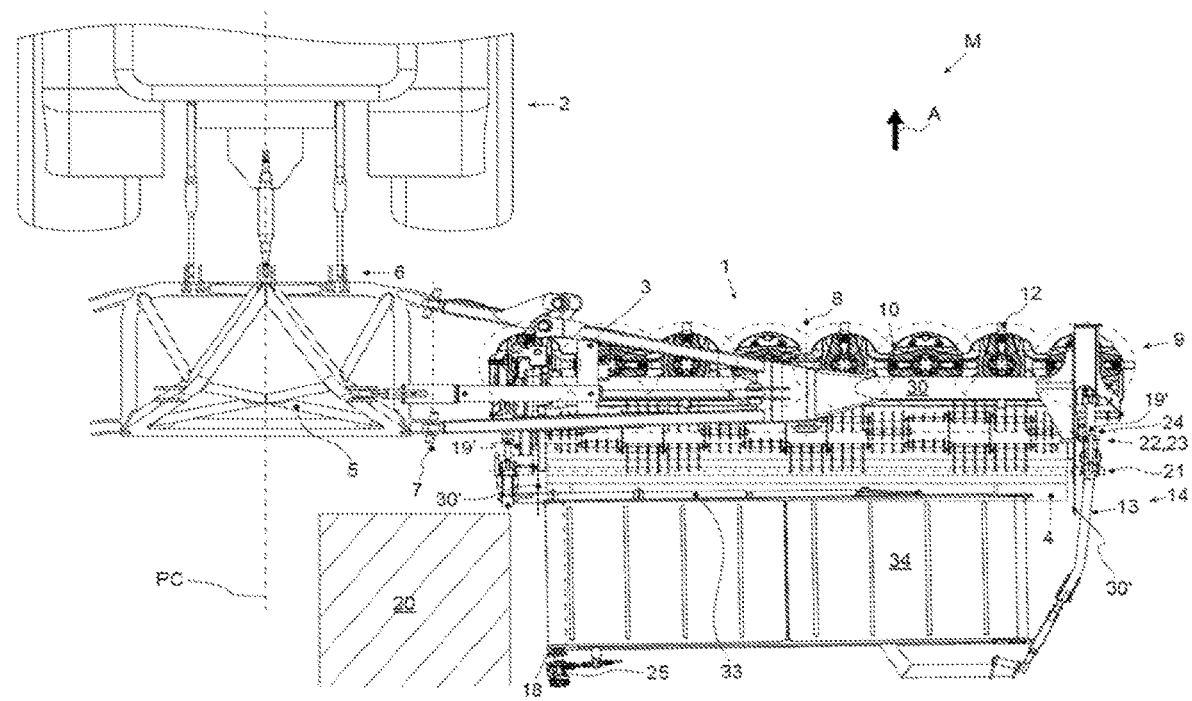

[Fig. 2]
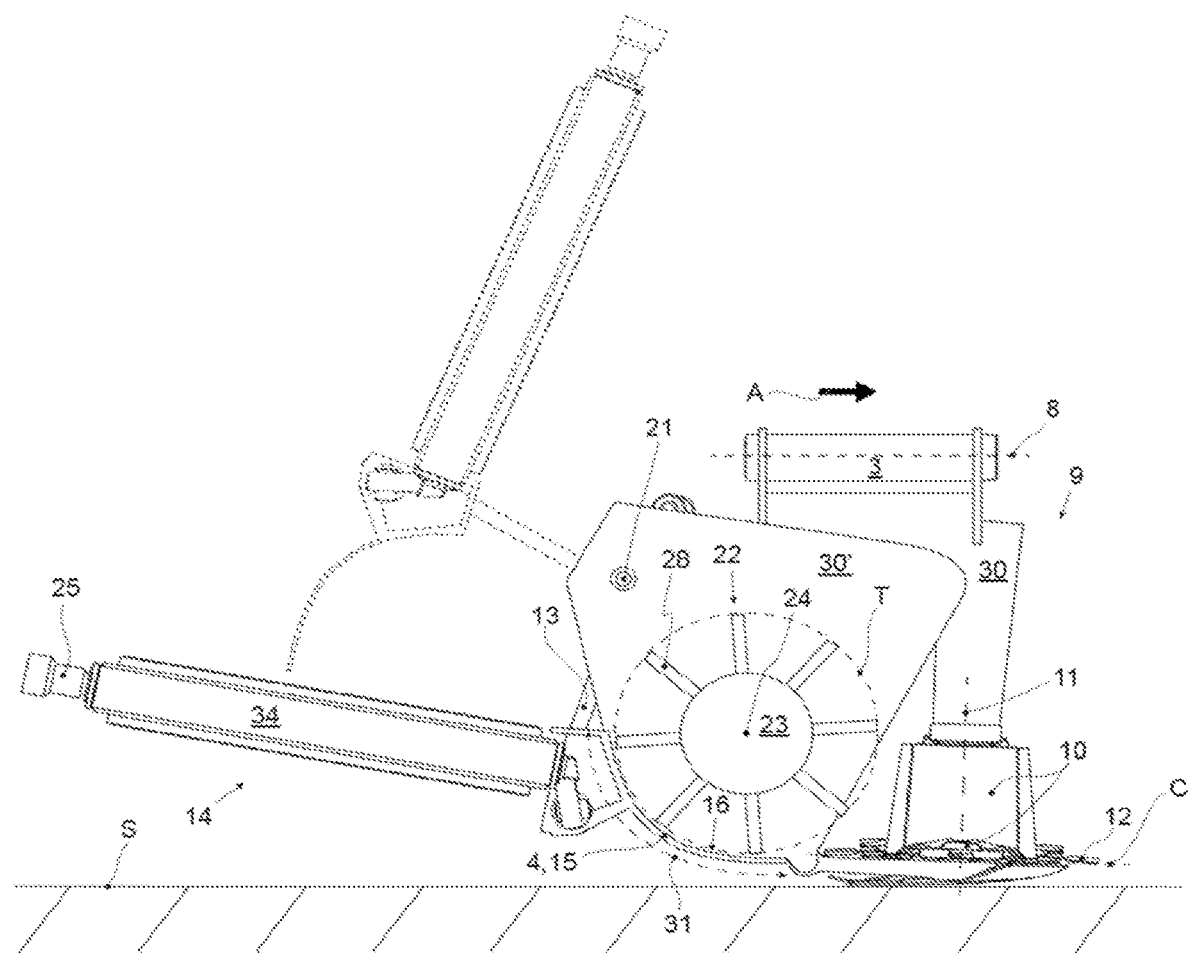

[Fig. 3]
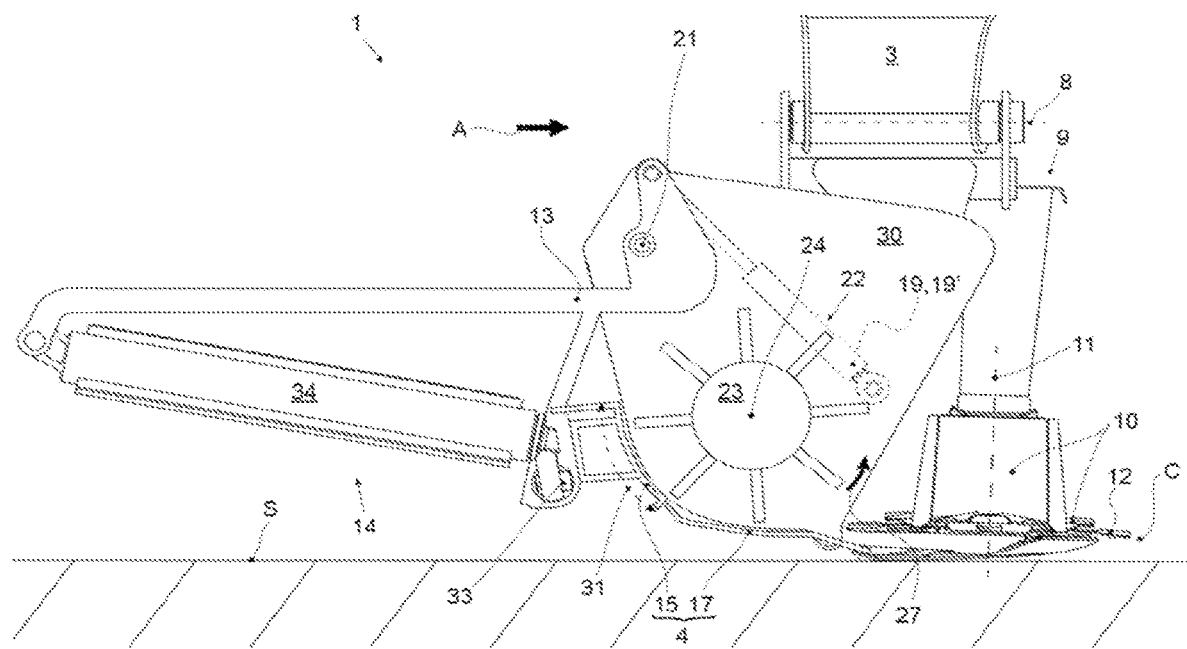

[Fig. 4]
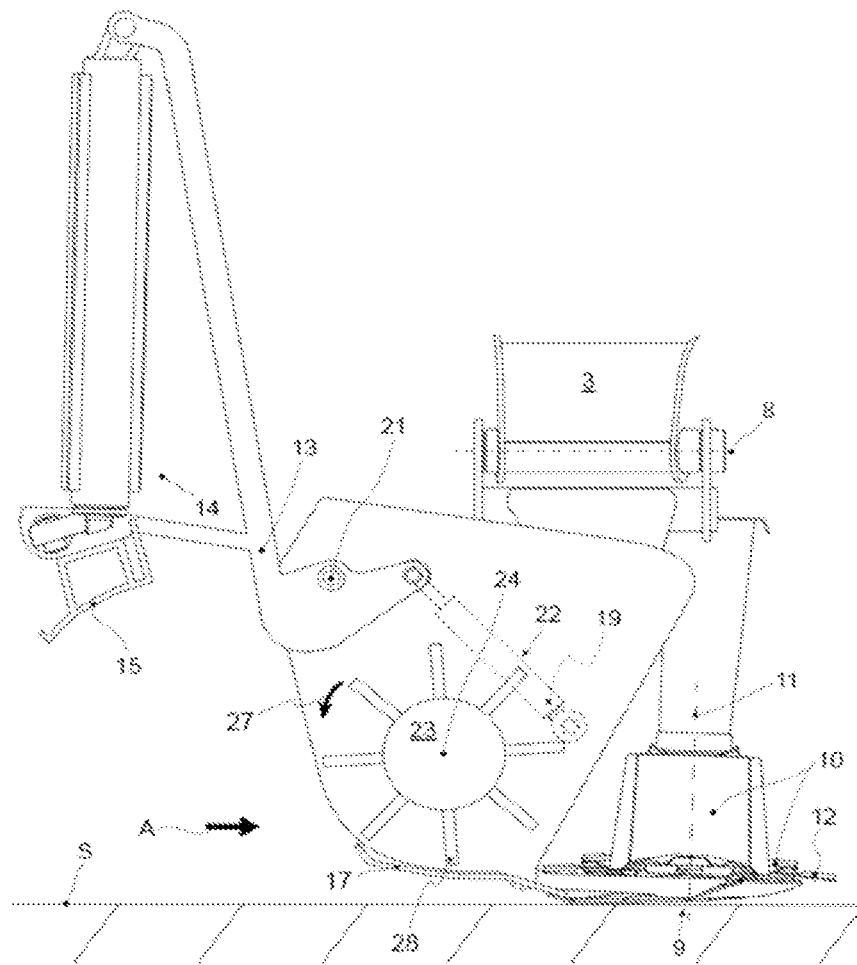

[Fig. 5]
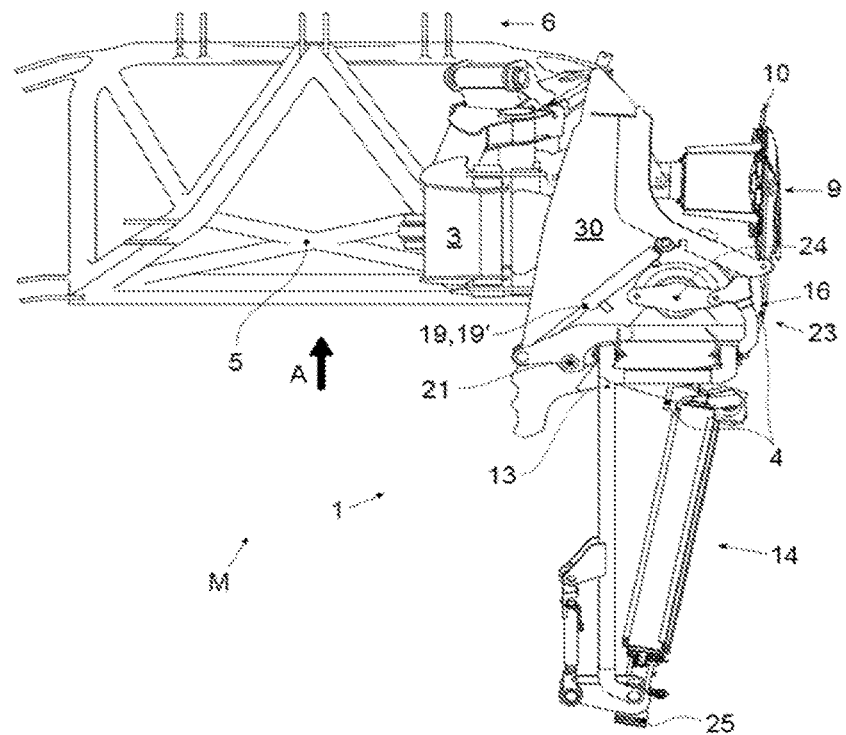
[Fig. 6]
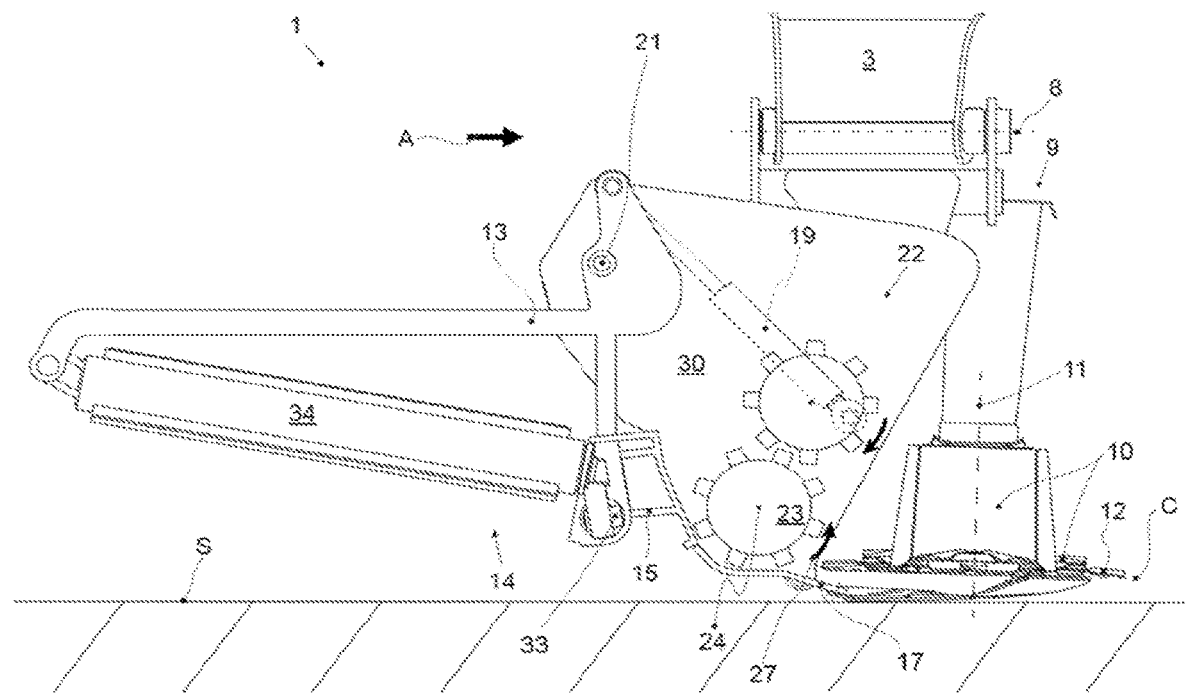

AGRICULTURAL DEVICE WITH A CUTTER BAR AND A REMOVABLE COLLECTING DEVICE AND AGRICULTURAL MACHINE COMPRISING SUCH A DEVICE

BACKGROUND OF THE INVENTION

Field of the Invention

The present invention relates to the general technical field of agricultural machinery. It concerns an agricultural device, in particular a haymaking device, which can be moved in a direction of advance and which includes a cutter bar equipped with cutting elements intended to cut a standing crop product. The device also comprises a conditioner positioned behind the bar, and a grouping device intended to move the product transversely to the direction of advance and located behind the bar, in an active position. A retraction actuator is configured to transpose the grouping device between the active position and a passive position in which the product is deposited at the rear of the device. The invention also concerns an agricultural machine equipped with such a device, as well as a method for access between a conditioner and a grouping device belonging to such a device.

Discussion of the Background

Through document FR 3 080 738 A1, which is incorporated into the present application for reference purposes, a device as described above is known of, whose conditioner is positioned behind the bar in such a way as to handle the product that the bar has just cut before it falls to the ground. However, it can happen that some product is not properly driven by the conditioner. Some of the product then ends up at the rear of the device, outside the swath formed by the grouping device. Subsequently, not all of the product is picked up by the harvesting machine. Over time, this residual product remaining on the ground can deteriorate plant cover, reducing its yield.

Furthermore, it is known from document WO16162862 to place a collecting device between the bar and the grouping device. The collecting device extends beneath the conditioner to prevent product from falling to the ground between the bar and the grouping device. The collecting device makes it possible to prevent product from falling to the ground. On the one hand, this falling product can involve a loss of product, as it may not be collected by the pick-up machine, thus reducing the work quality of the machine. On the other hand, this falling product can also cause the standing crop product to be smothered, which can reduce the yield of the future harvest. With the WO16162862 device, debris, such as stones and/or soil that have passed over the cutter bar, can end up on the collecting device. The accumulation of debris and/or product forms clumps on the upper surface of the collecting device, which leads to friction with moving parts, such as e.g. the cutting elements and the conditioner, or even their blockage. Slowing down parts results in a loss of work quality and/or requires greater power to drive the device. More seriously, the blockage of the moving parts can lead to a longer stoppage of the agricultural site, or even damage to the device and therefore maintenance and repair operations. In addition, some clumps may suddenly break off the collecting device and be projected in front of the cutter bar. Such projections crush the standing product which is then not cut, or cut poorly, deteriorating the work quality. Furthermore, some debris end up with the product deposited on the ground, altering the quality of the product.

In order to avoid the above-mentioned problems, it is advisable to carry out work operations regularly on the collecting device, in particular to clean it to remove the above-mentioned debris from it. In particular when the product is wet, several cleaning operations in one day may be required to avoid the above-mentioned drawbacks. Work operations on the collecting device necessarily require access to it. With the device in the WO16162862A1 document, access to the collecting device is difficult, as it requires passing through the cutter bar and/or the grouping device, rendering the cleaning of the collecting device, respectively its upper surface, tedious and hard.

Furthermore, passing through the bar, the grouping device and/or the conditioner leads to a risk of injury, which discourages people from carrying out the cleaning of the collecting device.

SUMMARY OF THE INVENTION

The purpose of the present invention is to remedy at least the main drawbacks mentioned above. In particular, it aims to propose a new device with easier access to the collecting device, a new machine including such a device, and a method for access between the conditioner and the grouping device of such a device, making it possible to promote regular and safe cleaning.

To this end, an important feature of the invention consists in the fact that the device comprises a collecting device which extends partially under and partially behind the conditioner in the active position of the grouping device, and that a movable part of the collecting device is fastened to the grouping device.

Because at least the part of the collecting device located at the rear of the conditioner is fastened with the grouping device, a space is freed up at the rear of the conditioner when the grouping device is in the passive position, providing direct and therefore easier access to the collecting device, respectively to its upper surface, while preventing, in the active position, product from being deposited outside the swath formed by the grouping device, thus making it possible to avoid a decrease in yield. This makes it easier and quicker to perform work operations on the collecting device, respectively its upper surface. In particular, the cleaning of the collecting device is carried out without passing through the cutter bar and/or the grouping device, presenting less risk of injury. As the plant cover is free of uncollected product, cutting quality is improved. Finally, removing debris or cleaning the collecting device makes the device lighter and reduces the power required to operate it.

BRIEF DESCRIPTION OF THE DRAWINGS

The invention will be better understood upon reading the following description, from which further advantages will emerge, with reference to the schematic drawings given as examples, in which:

FIG. 1 shows a top view of a device according to the invention that forms part of a machine coupled to a tractor, in work configuration of the device and in active position of the grouping device, with the collecting device shown in dotted lines.

FIG. 2 shows a cross-sectional side view of a device according to the invention in work configuration and in the active position of the grouping device and according to a first embodiment variant in which the movable part of the collecting device extends substantially up to the cutter bar, with the grouping device and the collecting device also shown in dotted lines in the passive position.

FIG. 3 shows a cross-sectional side view of a device according to the invention, in work configuration and in the active position of the grouping device, according to a preferred embodiment.

FIG. 4 shows a cross-sectional side view of a device according to the invention, in work configuration and in the passive position of the grouping device, according to the embodiment in FIG. 3.

FIG. 5 shows a top view of a machine equipped with a device according to the invention, in transport configuration.

FIG. 6 shows a cross-sectional side view of a device according to the invention, in work configuration and in the active position of the grouping device, according to an embodiment in which the conditioner is comprised of two drums whose conditioning means are inter-penetrating.

DESCRIPTION OF THE PREFERRED EMBODIMENT

As can be seen in FIG. 1, the present invention concerns an agricultural device 1 which can be moved in a direction of advance A and which includes a cutter bar 9 equipped with cutting elements intended to cut a standing crop product, a conditioner 22 positioned behind the bar 9, and a grouping device 14 intended to move the product transversely with respect to the direction of advance A and located, in an active position, behind the bar 9, with a retraction actuator 19 configured to transpose the grouping device 14 between the active position and a passive position in which the product is deposited at the rear of the device 1.

The device 1 according to the invention is an agricultural device 1, more specifically for haymaking. The device 1 forms part of a machine M. It is able to be driven by a tractor 2 or a similar vehicle. The machine M has at least one beam 3 connecting the device 1 to a framework 5 of the machine M. The machine M is connected to the tractor 2 by a coupling frame 6 which is rigidly fastened and/or which forms part of the framework 5. In a variant not shown, the device 1 is part of a self-propelled machine. The device 1 can be moved in a direction of advance A, preferably by the tractor 2 or by the self-propelled machine. The direction of advance A is represented by an arrow in the figures.

A central plane PC passes through the centre of the coupling frame 6 and/or the tractor 2, or, if applicable, the self-propelled machine. The central plane PC is parallel to the direction of advance A. The central plane PC is oriented vertically and/or perpendicularly to the axis of the lower pins of the coupling frame 6. The tractor 2 and/or the machine M, respectively its coupling frame 6, is substantially symmetrical with regard to the central plane PC.

In the present document, the notions of "side", "front", "rear", "in front of" and "behind" are defined when looking in the direction of advance A. The "width" dimension is to be considered perpendicularly to the direction of advance A and/or to the central plane PC. Furthermore, in this document, unless otherwise stated, any orientation is to be considered when the device 1 is in work configuration. To avoid unnecessary repetition, "active position" implicitly refers to the active position of the grouping device 14. Similarly, "passive position" refers to the passive position of the grouping device 14.

As shown in FIG. 1, the device 1 includes at least one cutter bar 9 equipped with cutting elements intended to cut a standing crop product. The device 1 has at least one conditioner 22 positioned behind the bar 9, and at least one grouping device 14 intended to move the product transversely to the direction of advance A and located behind the bar 9 in an active position. Furthermore, the device 1 includes a retraction actuator 19 configured to transpose the grouping device 14 between the active position and a passive position in which the product is deposited at the rear of the device 1. The bar 9 directs the product, preferably directly, to the conditioner 22, which directs the product, preferably directly, to the grouping device 14 when the latter is in active position.

As shown in the figures, a cutting element is, for example, a rotor 10. The rotors 10 are mounted on the bar 9 at more or less regular intervals. They are pivoted through high speed rotation, preferably by a train of gears incorporated into a gearbox containing lubricant. Each cutting element, respectively rotor 10, is driven in rotation around a respective rotation axis 11, preferably substantially vertical and/or slightly tilted forwards. The rotation axes 11 of the rotors 10 of a same bar 9 are aligned and contained in a same plane, preferably perpendicular to the direction of advance A. According to an alternative not shown, the rotation axes 11 of the cutter bar 9 are not aligned. A chassis 30 connects the bar 9 to the beam 3 of the machine M. The chassis 30 comprises a side flange 30' at each of its side ends.

Each rotor 10 includes knives 12 intended to cut the standing product. The standing product is a herbaceous or non-woody plant such as grass, a cereal or any plant with a stem. When the product is specified as "standing", it has not yet been cut by the bar 9. Otherwise, "product" indicates the product previously mown by the bar 9. The free ends of the rotors 10 follow a circular path, preferably overlapping the adjacent path(s). These paths are contained in a cutting plan C.

An important feature of the device resides in the fact that it includes a collecting device 4 extending partially under the conditioner 22 and partially behind the conditioner 22 in active position of the grouping device 14. More specifically, in active position of the grouping device 14, at least three quarters of the collecting device are located under the axis of the conditioner 22. The collecting device 4 thus collects the product that falls from the conditioner 22 when the latter fails to drive it, and keeps the plant cover clean at the rear of the device 1, in the active position. The collecting device 4 ensures that no product is deposited outside a swath 20 formed by the grouping device 14 in the active position, improving the work quality of the device 1. Moreover, after collection, such a device 1 entails less risk of the plant cover being smothered, thus avoiding a reduction in the yield of the plot. As can be seen in FIGS. 1 to 3, in active position of the grouping device 14, the collecting device 4 extends at least partially below the conditioner 22 viewed in the direction of advance A, and in a side view.

The device 1 is also characterized in that a movable part 15 of the collecting device 4, located at least partially behind the conditioner 22 in active position of the grouping device 14, is fastened to the grouping device 14. Thanks to this fastening, a space is opened behind the conditioner 22 in the passive position, providing direct access to the collecting device 4, respectively to an upper surface 16 of the collecting device 4, thus facilitating and improving its cleaning. In other words, in the passive position of the grouping device 14, the rear part of the conditioner 22 is clear. Also the access to the conditioner 22 is direct and therefore facilitated by the fastening of the movable part 15 to the grouping device 14 in the passive position. As can be seen from FIGS. 1 and 3, in active position of the grouping device 14, the movable part 15 extends partially below the conditioner 22 in the side view.

As can be seen in FIG. 1, in active position, the grouping device 14 is positioned behind the conditioner 22, so as to receive the product handled by the latter. In active position, the grouping device 14 is oriented substantially horizontally. In this position, it is driven in order to move the product transversely to the direction of advance A. The product is thus deposited in a swath 20 to the side of the device 1, respectively to the grouping device 14. The passive position enables the product to be deposited in a wider swath. In this case, it is referred to as spreading the product. In passive position, the grouping device 14 is lifted, preferably so that the rear of the conditioner 22 is completely free. In the passive position, the grouping device 14 is oriented substantially vertically. In this position, the product is deposited directly on the ground S by the conditioner 22 at the rear of the device 1.

As can be seen in FIGS. 2 to 4 in particular, the grouping device 14 is transposed between its active and passive positions by the retraction actuator 19 and by pivoting around a retraction axis 21. At least in work configuration of the device 1, the retraction axis 21 is transverse, and preferably perpendicular, to the direction of advance A and/or to the central plane PC. The pivoting makes it possible to pivot the grouping device 14 with regard to the bar 9. The retraction axis 21 is horizontal. In the active position, it is located at the front of the grouping device 14, which makes it possible to free up more space behind the conditioner 22 in the passive position. Furthermore, the retraction axis 21 is located above the conditioner 22, more specifically above the rear of the conditioner 22, so that pivoting of 100° or less enables the grouping device 14 to free up the space at the rear of the conditioner 22, and preferably to be above the conditioner 22, in passive position. It also results from this positioning that in passive position, the movable part of the collecting device 4 is further away from the conditioner 22, and preferably further away from the ground S, than in active position. Thus, the grouping device 14 and the movable part 15 of the collecting device 4 do not disrupt the product flow from the conditioner 22 in the passive position.

As shown in FIG. 1, the retraction actuator 19 is made up of two retraction jacks 19', preferably operated from a cab of the tractor 2. The retraction actuator 19 enables the grouping device 14 to be easily transposed between the active and passive positions, without leaving the cab. Each of the retraction jacks 19' is located at a side end of the conditioner 22, preferably adjacent to a side flange 30', ensuring the joint rotational guidance of the grouping device 14 and the collecting device 4 without the risk of these being deformed through torsion. Each retraction jack 19' is fastened to the chassis 30 on the one hand, and to the grouping device 14 on the other hand, respectively to the frame 13. It can be seen from the present description that the operation of the retraction actuator 19 makes it possible to transpose the grouping device 14 between the active and passive positions, so that easy, and preferably direct, access is possible between the conditioner 22 and the grouping device 14.

As shown in FIG. 2, in order to bring it as close as possible to the bar 9, the front of the conditioner 22 is preferably located above the bar 9. The conditioner 22, respectively the conditioning of the product, is intended to reduce the period during which the product is at risk of being damaged by rain. Indeed, the conditioner 22 makes it possible to reduce the overall drying time of the product. It also enables the drying of the product's stems and leaves to be synchronized.

The conditioner 22 comprises at least one drum 23, preferably equipped with conditioning means. During the operation of the device 1, the drum 23 is driven around a rotation axis 24. The rotation axis 24 of the drum 23 is transverse to the direction of advance A, and preferably parallel to the retraction axis 21. According to the embodiment example, the drum 23 is guided in rotation with regard to the chassis 30, preferably at each of its ends in the side flanges 30'. In order to reduce the weight of the device 1, and as can be seen in FIG. 1 in particular, the width of the conditioner 22 is slightly smaller than the width of the bar 9.

The drum 23 rotates in such a way that its lower end moves forward in the direction of rotation represented by the arrow 27. The conditioner 22 thus makes it possible to lift the product above the rotation axis 24 and to deposit it on the grouping device 14. The action of the conditioning means of the conditioner 22, respectively of the drum 23, as it is driven, enables the drying of the product to be accelerated.

In the preferred embodiment, the conditioner 22 includes a single drum 23. The conditioning means are made up of fingers 28, or flails, distributed over the drum 23. The fingers 28 extend radially with respect to the rotation axis 24. Such an embodiment makes it possible to limit the number of elements of the conditioner 22, and thus to simplify the device 1. Each finger 28 can be articulated with the drum 23 around an axis parallel to the rotation axis 24, so as to avoid damage when it encounters an obstacle such as a stone.

During rotation, the drum 23, respectively the outer ends of the conditioning means, form(s) an outer Path T around the rotation axis 24. Viewed along the rotation axis 24, the Path T is a circle.

The upper surface 16 is the surface facing the conditioner 22 in active position. Viewed along the rotation axis 24 and in the active position, the collecting device 4, respectively the upper surface 16, follows the Path T, avoiding any product clinging and the formation of large clumps on the collecting device 4. In the active position, the distance between the collecting device 4, respectively the upper surface 16, and the Path T is less than 15%, preferably less than 10%, and even more preferably less than 7% of the radius of the Path T.

As shown in FIG. 2, according to a first simple variant, the collecting device 4 has a movable part 15 which extends partially under and partially behind the conditioner 22 in the active position, and preferably from the front of the grouping device 14 to the rear of the bar 9. In this first embodiment variant, the movable part 15 and the bar 9 are preferably adjacent to each other, with no interval. The front end of the collecting device 4, respectively of the fixed part 17, is preferably located below the cutting plan C in the active position, and preferably also lower than the conditioner 22. In order to effectively collect the product, the movable part 15 extends substantially across the entire width of the conditioner 22, parallel to the rotation axis 24.

In this first embodiment variant, the movable part 15 covers, in the active position, an angular sector 31 of at least a quarter of the Path T, viewed along the rotation axis 24. In passive position, such a size of the movable part 15 makes it possible to clear a significant portion of the Path T, and preferably of the bottom of the conditioner 22. However, the grouping device 14 must be pivoted by an angle of more than 100° so that the movable part 15 does not disrupt the product flow from the conditioner 22 in passive position.

The angular sector 31 is located at the rear of the conditioner 22, so that it is easy to access the conditioner 22 in passive position, particularly when the device 1 is lifted off the ground S, such as e.g. in an operating position of the machine M. Furthermore, the angular sector 31 is located at least partially below the rotation axis 24, so that the movable part 15 does not disrupt the product flow in active position. In the passive position, the angular sector 31 is uncovered. "Covering the angular sector 31" means that the movable part 15 is located in the vicinity of the Path T. In this first embodiment variant, the collecting device 4 is formed only by the movable part 15. The movable part 15 is preferably bolted to the frame 13, but could also be welded.

According to the preferred embodiment shown in FIGS. 3 and 4, the collecting device 4 includes a movable part 15 located at least partially behind the conditioner 22 in active position, and a fixed part 17. As shown in FIG. 3, the movable part 15 may also extend partially under the conditioner 22. The fixed part 17 is located at least partially, and preferably entirely, under the conditioner 22. It is fastened with the bar 9, respectively with the chassis 30, preferably with each of the side flanges 30', and preferably through bolting. In this preferred variant, the upper surface 16 is divided between the fixed part 17 and the movable part 15.

The movable part 15 thus extends, according to the direction of advance A and in active position of the grouping device 14, at least partially between the fixed part 17 and the grouping device 14. The fixed part 17 makes it possible that in passive position of the grouping device 14, the collecting device 4, respectively the movable part 15, does not disrupt the product flow between the conditioner 22 and the ground S. Specifically, when the grouping device 14 is pivoted at a defined angle around the retraction axis 21, a collecting device 4 with a movable part 15 causes less disruption of the product flow from the conditioner 22 in passive position of the grouping device 14. This results in a more uniform swath 20, ensuring faster and more even drying of the product. In addition, the length of the device 1, respectively of the machine M, is lower in passive position. In active position of the grouping device 14, the movable part 15 extends at least partially between the conditioner 22 and the grouping device 14 according to the direction of advance A. In this way, no product can fall between the grouping device 14 and the conditioner 22 in the active position of the grouping device 14. In addition, the fact that the endless belt 34 does not extend to the rear of the grouping device 14 enables its size to be limited, reducing the weight of the device 1, its size, and its complexity.

In the active position, the collecting device 4 and the bar 9 are adjacent to each other, so that the product does not fall to the ground S between them. All the product is then found on the swath 20 or above the collecting device 4, avoiding product falling on the ground S. The plant cover is spared and less product loss can occur. In the preferred embodiment shown in FIG. 3, the fixed part 17 of the collecting device 4 and the bar 9 are adjacent to each other in active and passive positions of the grouping device 14. In this embodiment, the movable part 15 and the fixed part 17 are adjacent to each other in active position of the grouping device 14.

In the preferred embodiment, in the active position, the movable part 15 covers an angular sector 31 of at least one eighth of the Path T, viewed along the rotation axis 24. The fixed part 17 extends substantially across the entire width of the conditioner 22, parallel to the rotation axis 24, preventing any product from falling to the ground S between the bar 9 and the movable part 15, at least in active position. Movable part 15 and fixed part 17 are adjacent to each other in active position. In the preferred embodiment, the angular sector covered by the fixed part 17 is substantially equal to the angular sector 31 covered by the movable part 15, i.e., slightly greater than one eighth of the Path T viewed along the rotation axis 24. However, a different distribution between the angular sector covered by the fixed part 17 and the angular sector 31 covered by the movable part 15 is possible.

The fixed part 17 is preferably made of sheet metal. It extends substantially horizontally, or parallel to cutting plan C. In this preferred embodiment, the movable part 15 extends substantially vertically, or slightly tilted towards the rear. Thanks to the fastening of the movable part 15 of the collecting device 4 on the grouping device 14, it is possible to easily access the fixed part 17 in the passive position, respectively the upper surface 16, without the movable part 15 disrupting the product flow from the conditioner 22, even if the grouping device 14 is pivoted by less than 100°.

As can be seen in FIG. 2, the collecting device 4, respectively its upper surface 16, has a substantially circular arc shape centred on the rotation axis 24 of the drum 23. According to the preferred embodiment, in order to avoid stones or debris being thrown towards the rear of the device 1 in passive position of the grouping device 14, the rear end of the fixed part 17 is located under the drum 23, and, viewed along the rotation axis 24, has an upper surface forming a smaller angle with the vertical than a tangent to the Path T of the drum 23 at the closest point to the Path T. Thanks to this orientation of the rear end of the fixed part 17, stones and debris from the rotors 10 are ejected upwards rather than backwards, advantageously reducing the dangerousness of the machine M.

Preferably, the collecting device 4, respectively the movable part 15, extends substantially vertically up to the height of the grouping device 14 in its active position. In other words, the high end of the collecting device 4, respectively of the movable part 15, is lower than the high end of the grouping device 14 in active position. The grouping device 14, respectively the endless belt 34 and its driving means, are thus protected against the ingress of product or other debris. In the case of a grouping device 14 with an endless belt 34, the collecting device 4, respectively the movable part 15, extends very slightly above the front of the upper side of the endless belt 34. Preferably, the upper end of the collecting device 4, respectively the movable part 15, is substantially at the same height as the rotation axis 24 of the conditioner 22, thus enabling the conditioner 22 to transfer product to the grouping device 14. As can be seen in FIGS. 2 and 3, at least three quarters of the upper surface 16 are located below the conditioner 22. More specifically, at least three quarters of the upper surface 16 are below the rotation axis 24.

The retraction actuator 19 allows the grouping device 14 to be rotated together with the movable part 15 between its active and passive positions by at least 60°, preferably by at least 75°, and even more preferably by at least 90°. The greater the pivoting of the grouping device 14, the easier the access to the collecting device 4.

In order to move the product, the grouping device 14 comprises at least one roller 18 driven around a drive axis substantially horizontal and/or parallel to the ground S, at least in the active position. As shown in the figures, the drive axis of the roller 18 is substantially parallel to the direction of advance A, and/or to the central plane PC in the active position. In the embodiments and variants shown, the grouping device 14 comprises an endless belt 34. This belt 34 is driven by the roller 18. Furthermore, it is tensioned by a second roller with an axis parallel to the drive axis of the first roller 18. The product rests on the belt 34 as it moves transversely with respect to the direction of advance A. The product cannot therefore pass through the belt 34. For this, it can be made of rubber or plastic, which makes it light and requires little energy for it to be driven. In addition, it usually has no openings in order to prevent product loss from below.

The grouping device 14, respectively the endless belt 34, extends along the rotation axis 24 over at least 65% of the width of the conditioner 22. Preferably, the grouping device 14, respectively the endless belt 34, extends along the rotation axis 24 over at least 75% and even more preferably at least 85% of the width of the conditioner 22. Such dimensional proportionalities make it advantageously possible for the entirety of the forage driven by the conditioner 22 to be moved, while reducing the width of the grouping device 14, and therefore its weight. The grouping device 14 also comprises a frame 13 connecting the roller 18 with the bar 9, respectively with the chassis 30. Preferably, the collecting device 4, or at least the movable part 15, is fastened to the grouping device 14 by the frame 13.

As can be seen in FIG. 3, the movable part 15 is oriented, in the passive position, in such a way that the product and/or debris accumulated thereon can fall through gravity, and preferably the upper side 16 to the ground S. Advantageously, the cleaning of the movable part 15 is limited to a transposition of the grouping device 14 between its active and passive positions, preferably simply by operating the retraction actuator 19.

In the active position, at least one roller 18 of the grouping device 14 is rotationally driven, preferably by an auxiliary engine 25. In the passive position, since the grouping device 14 does not act on the product, it is not rotationally driven, thus advantageously requiring less power. The power source, whether hydraulic or electrical, preferably comes from the tractor 2. Advantageously, when the grouping device 14 is transposed in passive position, the auxiliary engine 25 is automatically stopped, for example by a stop valve or a switch.

In order to reduce the dimensions perpendicularly to the direction of advance A and parallel to the ground S, the device 1 can be transposed between a work configuration, shown in FIGS. 1 to 4, and a transport configuration, shown in FIG. 5. In the work configuration, the device 1 rests on the ground S, at least partially. In the transport configuration, it is further away from the ground S. In the transport configuration, the device 1 preferably extends substantially vertically. In this configuration, the rotation axis 24 is substantially parallel to the central plane PC. For the transposition between work and transport configurations, in the case of a machine M, the beam 3 is articulated with the framework 5, preferably around a folding axis articulation 7 parallel to the direction of advance A. The beam 3 can be articulated with the device 1 at least around a tilting axis 8 parallel to the folding axis 7.

The collecting device 4, respectively the movable part 15 and the fixed part 17, preferably do(es) not have any openings through which the product can pass. However, the rotors 10 generally project the product backwards at a distance from the bar 9 such that it is possible to move the front end of the collecting device back so that it is slightly behind the bar 9, as shown in FIG. 2. Alternatively, the collecting device 4 could have small openings that do not allow any product in the form of stems, such as grass, to pass through. In particular, the collecting device 4 could be perforated sheet metal.

In order to be able to mow the product without grouping it, it is provided for the grouping device 14 to be removable from the device 1, preferably with the frame 13, for example by means of screws. When the grouping device 14 is removed, the movable part 15 of the collecting device 4 is also removed from the device 1, limiting its weight and dimensions.

In order to vary the width of the swath 20 deposited by the grouping device 14 in the active position, a longitudinal actuator 33 is positioned in such a way as to move the grouping device 14 transversely, and preferably orthogonally, to the direction of advance A with respect to the conditioner 22. As can be seen in FIGS. 2 to 4, the collecting device 4 extends in front of and above the longitudinal actuator 33 in the active position, so as to protect the latter, and in particular so as to prevent product and/or debris from accumulating therein, as this could hinder the operation and service life of the longitudinal actuator 33.

As shown in FIG. 1 in particular, the machine M may comprise a single device 1. It can also be seen in FIG. 1 that the shape of the framework 5 of the machine M is provided to be able to support an additional device, preferably identical to the device 1, and preferably symmetrical to the latter with respect to the central plane PC. In the transport configuration of the device 1, the grouping device 14 is in active position, which makes it possible to advantageously reduce the width of the device 1, respectively of the machine M.

As can be seen in FIGS. 2 to 4, the movable part 15 is located partially behind and partially under the conditioner 22 in active position of the grouping device 14, providing better access to the collecting device 4, respectively the upper surface 16, as well as enabling easier passage of the product in passive position of the grouping device 14. In a variant not shown, the movable part 15 is only located behind the conditioner 22 in active position of the grouping device 14.

According to an important feature, a method enables access between the conditioner 22 and the grouping device 14 belonging to the device 1, this device 1 being movable in a direction of advance A and also including a cutter bar 9 equipped with cutting elements intended to cut a standing crop product, the conditioner 22 being positioned behind the bar 9, and the grouping device 14 being intended to move the product transversely to the direction of advance A, this grouping device 14 being transposable between an active position and a passive position, the method being characterized in that at least one movable part 15 of a collecting device 4 is fastened to the grouping device 14 and is located partially under and partially behind the conditioner 22 in the active position, and in that the grouping device 14 is transposed by the retraction actuator 19 between active and passive positions. In this way, the transposition of the grouping device 14 between the active and passive positions advantageously enables the movable part 15 to switch from the active position, in which it is close to the collecting device 22, to the passive position, in which it is further away from the conditioner 22. This transposition thus enables easy access between the conditioner 22 and the grouping device 14. Preferably, this transposition allows direct access to the collecting device 4, i.e., without passing through the bar 9 or the grouping device 4.

In another embodiment shown in FIG. 6, the conditioner 22 comprises a secondary drum rotationally driven around an axis substantially parallel to the rotation axis 24. The secondary drum is then located above the drum 23. The drum 23 and the secondary drum rotate in opposite directions in order to drive the product between them. The drums have inter-penetrating conditioning means such as ribs. These ribs can notably be longitudinal or helical.

In another embodiment not shown, the grouping device 14, respectively the roller 18, comprises an auger and its drive axis is substantially perpendicular to the direction of advance A. The product is then moved at least partially under the drive axis of the roller 18, which in this case is substantially parallel to the rotation axis 24. The collecting device 4 then extends to the rear of the grouping device 14, thus preventing product from falling onto the ground S from behind the bar 9 up to the rear of the grouping device 14. Finally, in another embodiment not shown, the grouping device 14 is made up of the roller 18, next to which several secondary rollers with axes parallel to the drive axis of the roller 18 are driven in rotation.

In another embodiment not shown, the grouping device 14 is connected to the chassis 30 by a four-bar mechanism, whereby the retraction actuator 19 causes the grouping device 14 to shift with regard to the bar 9.

The bar 9, the grouping device 14 and the conditioner 22 can be driven by a same power source, and in particular by the power take-off shaft of the tractor 2. However, only one or each one can also be driven separately by one or more auxiliary engines. The retraction actuator 19 could also be produced by a pneumatic jack, and/or a hydraulic or electric motor, also remotely controlled.

The device 1 and the machine M that have just been described are only examples of embodiment, which does not limit the field of protection defined by the following claims.

What is claimed as new and desired to be secured by Letters Patent of the United States is:

1. An agricultural device being movable in a direction of advance and comprising:
   a cutter bar equipped with cutting elements intended to cut a standing crop product,
   a conditioner positioned behind the cutter bar, and
   a grouping device intended to move the product transversely to the direction of advance and located, in an active position, behind the cutter bar,
   a retraction actuator being configured to transpose the grouping device between the active position and a passive position in which the product is deposited at a rear of the grouping device, and
   a collecting device which extends, in the active position of the grouping device,
partially under and partially behind the conditioner,
   wherein a movable part of the collecting device is fastened to the grouping device, and
   wherein in the active position of the grouping device, the collecting device and the cutter bar are adjacent to each other,
   wherein in the active position of the grouping device, the collecting device extends from the cutter bar to the grouping device along the direction of advance,
   wherein the conditioner comprises a drum driven in rotation around a rotation axis forming a path, and
   wherein the movable part covers, in the active position, an angular sector of at least one eighth of the path, viewed along the rotation axis.

2. The agricultural device according to claim 1, wherein the agricultural device comprises a fixed part fastened with the cutter bar and located at least partially under the conditioner.

3. The agricultural device according to claim 2, wherein a rear end of the fixed part is located under the drum and has, viewed along the rotation axis, an upper surface forming a smaller angle with a vertical plane than a tangent to the path of the drum at a point closest to the path.

4. The agricultural device according to claim 2, wherein the movable part extends, according to the direction of advance and in active position of the grouping device, at least partially between the fixed part and the grouping device.

5. The agricultural device according to claim 1, wherein the movable part covers, in the active position, an angular sector of at least one quarter of the path of the drum, viewed along the rotation axis.

6. The agricultural device according to claim 5, wherein in the active position, a distance between the collecting device and the path is less than 15% of a radius of the path, viewed along the rotation axis.

7. The agricultural device according to claim 1, wherein the grouping device comprises an endless belt driven by a roller.

8. The agricultural device according to claim 1, wherein the grouping device is capable of being transposed by the retraction actuator between the active position and the passive position by pivoting around a retraction axis transverse to the direction of advance.

9. The agricultural device according to claim 1, wherein the retraction actuator allows the grouping device to be pivoted together with the movable part by at least 60°.

10. The agricultural device according to claim 1, wherein, in the passive position, the movable part is oriented in such a way that the product accumulated therein falls through gravity.

11. The agricultural device according to claim 1, wherein the movable part is located partially behind and partially under the conditioner in the active position of the grouping device.

12. An agricultural machine which includes at least one device according to claim 1.

13. A method providing access between a conditioner and a grouping device belonging to an agricultural device, the agricultural device being movable in a direction of advance and including a cutter bar equipped with cutting elements intended to cut a standing crop product, the conditioner being positioned behind the cutter bar, and the grouping device being intended to move the crop transversely to the direction of advance, the grouping device being transposable between an active position and a passive position, wherein at least one movable part of a collecting device is fastened to the grouping device and is located partially under and partially behind the conditioner in the active position, the method comprising:
   transposing the grouping device by a retraction actuator between the active position and the passive position,
   wherein in the active position of the grouping device, the collecting device and the cutter bar are adjacent to each other,
   wherein in the active position of the grouping device, the collecting device extends from the cutter bar to the grouping device along the direction of advance,
   wherein the conditioner comprises a drum driven in rotation around a rotation axis forming a path, and
   wherein the movable part covers, in the active position, an angular sector of at least one eighth of the path, viewed along the rotation axis.

* * * * *